United States Patent [19]

Thomas et al.

[11] 4,360,225
[45] Nov. 23, 1982

[54] PASSIVE SEAT BELT SYSTEM

[75] Inventors: Rudy V. Thomas, Sterling Heights; Robert L. Stephenson, Utica; Richard L. Frantom, Richmond, all of Mich.

[73] Assignee: Allied Corporation, Morris Township, Morris County, N.J.

[21] Appl. No.: 193,685

[22] Filed: Oct. 3, 1980

Related U.S. Application Data

[63] Continuation-in-part of Ser. No. 138,956, Apr. 10, 1980.

[51] Int. Cl.³ .............................................. B60R 21/10
[52] U.S. Cl. .................................... 280/804; 297/464
[58] Field of Search ................ 297/464, 469; 280/801, 280/804, 802, 806

[56] References Cited

U.S. PATENT DOCUMENTS

| | | | |
|---|---|---|---|
| 3,940,164 | 2/1976 | Non | 280/804 |
| 4,235,456 | 11/1980 | Shakespear | 280/804 |
| 4,283,075 | 8/1981 | Wize | 280/804 |

Primary Examiner—Richard A. Bertsch
Attorney, Agent, or Firm—Roger H. Criss

[57] ABSTRACT

A passive seat belt system, such as for a three occupant seat, including a rotatable shaft mounted on the vehicle roof and a carriage movable on the shaft in response to rotation of a seat belt retractor as seat belt webbing is extended and retracted as a result of door movement.

22 Claims, 4 Drawing Figures

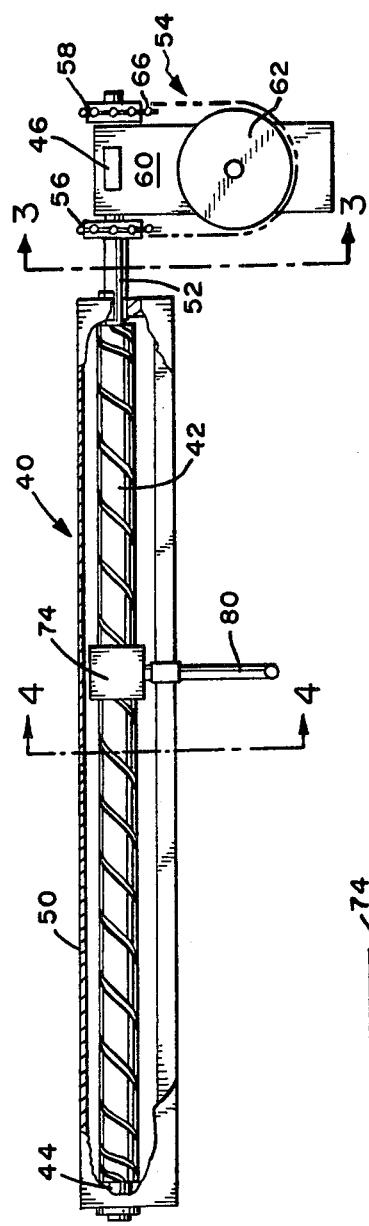
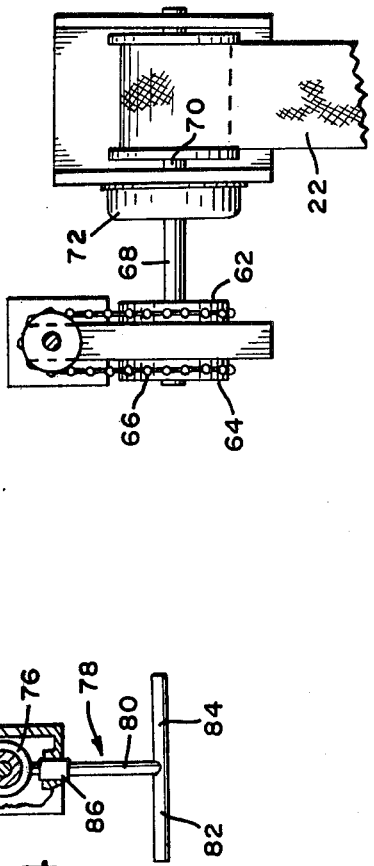

PASSIVE SEAT BELT SYSTEM

DESCRIPTION

Cross-Reference to Copending Applications

This application is a continuation-in-part of Ser. No. 138,956 filed Apr. 10, 1980.

BACKGROUND OF THE INVENTION

1. Field of the Invention

This invention relates to a passive seat belt system.

2. Description of the Prior Art

A passive seat belt system for a three occupant vehicle seat is described in the aforementioned parent application in the form of a shaft extending along the roof of a vehicle between the center and outboard occupants' seating positions. In such a system, the upper anchor points of the belts are movable in order to provide access for the passengers and means are provided to insure proper load-transfer positioning of the anchor points when the belts are in use. A passive seat belt system for a single seat position which also utilizes a movable anchor point is shown in copending application Ser. No. 112,668 filed Jan. 16, 1980 in the name of one of the inventors herein. It would be desirable to provide a passive seat belt system, such as a three occupant seat passive seat belt system, which totally insures that the anchor points are always in proper load-transferring position.

SUMMARY OF THE INVENTION

In accordance with this invention, there is provided in a passive seat belt system including at least one seat belt mounted in the vehicle for movement between restraining and non-restraining positions for an occupants' seat in the vehicle and movable means movable along a shaft mounted in the vehicle and operable to move the seat belt between its restraining and non-restraining positions, the improvement comprising:

the movable means comprising means for contacting the belt to move the belt between its said positions, the shaft being rotatably mounted in the vehicle and the shaft being rotatable in response to a force applied to the belt.

Also in accordance with this invention, there is provided a passive seat belt system for a vehicle having center and outboard passenger seating positions, a door adjacent the outboard passenger's seating position and a roof, the system comprising:

first anchor means mounted outboard of the outboard passenger's seating position;

second anchor means mounted at a fixed position in the vehicle;

a seat belt for the outboard passenger's seating position having one end attached to the first anchor means and the other end attached to the second anchor means;

third anchor means provided in the vehicle;

fourth anchor means mounted at a fixed position in the vehicle;

a seat belt for the center passenger's seating position having one end attached to the third anchor means, the third anchor means being located at a position such that the seat belt for the center passenger's seating position is adapted to extend across the seating position from the inboard side thereof, the other end of the belt being attached to the fourth anchor means; and movable means connected to the roof of the vehicle at a position adjacent to the center and outboard passengers' seating positions, each of the seat belts being adapted for contact with the movable means, the movable means being movable to a first position in the vehicle whereby the belts are in non-restraining positions to facilitate access to the center and outboard passengers' seating positions and the movable means being movable to a second position in the vehicle whereby the belts are in restraining positions to provide seat belt restraint for the seating positions.

In further accordance with this invention, there is provided a passive seat belt system adapted for installation in a vehicle having center and outboard passenger seating positions, a door adjacent the outboard passenger's seating position and a roof, the system comprising:

first anchor means adapted to be mounted outboard of the outboard passenger's seating position;

second anchor means mounted at a fixed position in the vehicle;

seat belt means for the outboard passenger's seating position having one end attached to the first anchor means and the other end attached to the second anchor means;

third anchor means adapted to be mounted in the vehicle;

fourth anchor means mounted at a fixed position in the vehicle;

seat belt means for the center passenger's seating position having one end attached to the third anchor means and the other end attached to the fourth anchor means; and movable means adapted to be connected to the roof of the vehicle at a position adjacent the seating positions, each of the seat belt means adapted for contact by the movable means, the movable means adapted for movement to a first position whereby both the seat belt means are in non-restraining positions to facilitate access to the center and outboard passengers' seating positions, the movable means adapted for movement to a second position whereby both the seat belt means are in restraining positions to provide seat belt restraint for the seating positions.

It can be seen that in accordance with this invention, the anchor points of the seat belt are fixed in a load-transferring position and the movable means is provided to move the seat belts toward a forward position to permit access to the vehicle seat as opposed to moving the anchor points.

BRIEF DESCRIPTION OF THE DRAWINGS

FIG. 2 is a side view of a portion of the system shown in FIG. 1 including a spiral shaft and a sprocket transmission.

FIG. 3 is a view taken along line 3—3 of FIG. 2.

FIG. 4 is a view taken along line 4—4 of FIG. 2.

DESCRIPTION OF THE PREFERRED EMBODIMENTS

Figure 1:
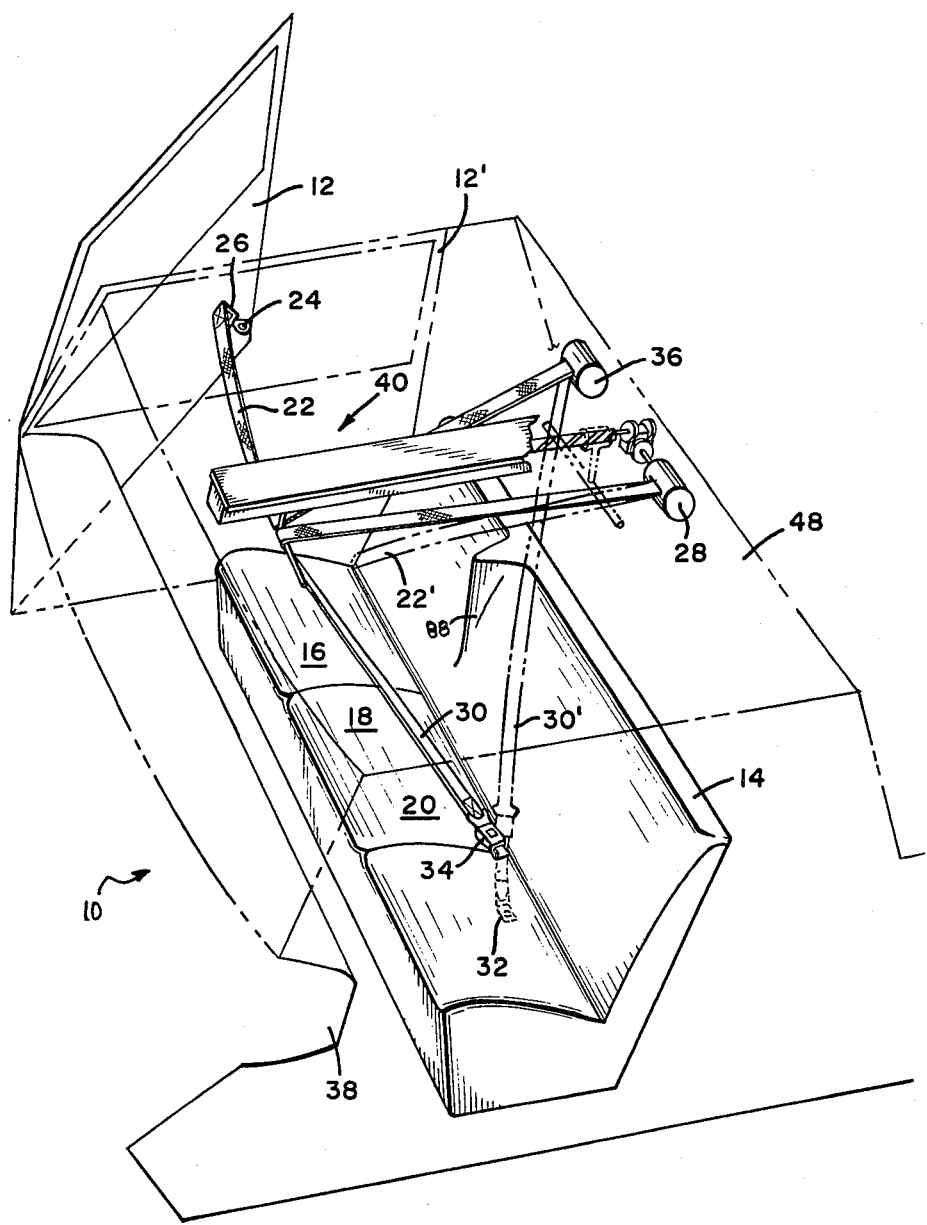
FIG. 1 is a perspective view of one embodiment of the passive seat belt system of this invention.

With respect to FIG. 1, there is shown a preferred embodiment of a passive seat belt restrain system, generally indicated at 10, in a vehicle having a passenger's door 12 and a seat 14 having seating positions 16, 18 and 20 for the outboard passenger, center passenger and driver, respectively. Since the driver's seat belt system is independent of the center and outboard passenger system in the preferred embodiment, such system is not shown. The driver's system may be any suitable restraint systems, such as a two or three point passive seat belt system. The outboard passenger's belt system includes a torso belt 22 which is anchored at one end to the lower corner of door 12 via anchor 24 and is attached at its opposite end to a roof mounted retractor 28. A seat belt buckle and tongue assembly 26 attaches belt 22 to anchor 24 so as to provide an emergency release for the system. It should be noted than an emergency release may alternatively be provided in retractor 28 if one is desired.

The center passenger's seat belt assembly includes a torso belt 30 having one end connected to the vehicle floor through anchor 32. A seat belt buckle and tongue assembly 34 connects belt 30 and anchor 32 to provide an emergency release for such system. The other end of the center passengers belt 30 is attached to a retractor 36 which is also mounted to the roof of the vehicle. It should be noted that retractors may be located at either the upper or lower anchor points, or both, of the center passenger's seat belt system.

Since the outboard and center passengers' upper anchor points are in the same general location, a common articulation device can be employed. A single knee bolster 38 is provided to restrain the passengers' knees in the event of a collision. Alternatively, separate knee bolsters for each seating position may be employed.

Retractors 28 and 36 may be of any conventional design and preferably are of the emergency locking type which is either vehicle or web sensitive or both vehicle and web sensitive.

A common articulation device generally indicated at 40 is provided along the roof of the vehicle to move belts 22 and 30 into and out of their respective restraining positions. Device 40 includes a variably pitched spirally grooved shaft 42 which is rotatably mounted in bearing blocks 44, 46 to roof 48. Shaft 42 is contained within a housing 50, the lower part of which may be in the form of a trim panel and is provided with a longitudinal slot. The rearward end 52 of shaft 42 serves as the shaft for a sprocket chain transmission 54. Sprocket wheels 56 and 58 are fixed to shaft 42. A block 60 receives shaft 42 between wheels 56 and 58 along its upper portion and provides a rotatable bearing for lower sprocket wheels 62, 64 extending on either side of the lower portion of block 60. A sprocket chain 66 is trained around the sprocket wheels. Sprocket wheels 62, 64, which have a somewhat larger diameter than wheels 56, 58, are fixed to an extension 68 of the main shaft 70 of retractor 28. Extension of webbing 32 from retractor 28 against the bias of a conventional rewind spring 72 causes rotation of shaft extension 68 and hence sprocket wheels 62 and 64. This motion is transferred via transmission 54 to a rotary motion of wheels 56, 58 and hence shaft 42. A carriage 74 surrounds the spirally grooved section of shaft 42 and is movable therealong in a substantially forward and reverse linear direction along vehicle roof 48. Carriage 74 includes a substantially circular section 76 having a means (not shown) which rides within a groove of shaft 42. A ball and plug device may be employed for such purpose. Reference is specifically made to the aforementioned copending application Ser. No. 112,688 for disclosure of a suitable device for permitting the carriage to ride along a spirally grooved shaft. The disclosure of such application is expressly incorporated herein by reference.

Extending from section 76 of carriage 74 is a substantially inverted T-shaped bar 78 including a central leg 80 and lateral legs 82, 84 which act as guide bars for belts 30 and 22, respectively. Movement of carriage 74 along shaft 42 causes guide bars 82 and 84 to move belts 30 and 22 to a forward position along roof 48. A low friction slide 86 is provided over leg 80. Slide 84 slides within the slot formed in lower portion of housing 50 and serves to prevent carriage 74 from rotating.

In operation, when door 12 is closed, its position is shown in phantom in the drawing and indicated at 12'. The rearward, restraining position of belts 22 and 30 are also shown in phantom and indicated by 22' and 30', and the guide bars 82 and 84 are in their rearward position. As door 12 is opened by the occupant egressing from or ingressing to the vehicle, webbing 22 is extracted from retractor 28. Shaft 70 of retractor 28 is thereby rotated which results in a rotary motion of spirally grooved shaft 42. Consequently, carriage 74 rides along the turning shaft 42 in a linearlly forward direction in the vehicle along the roof line. Guide bars 82 and 84 are thus brought into contact with belts 30, 22 (or they are already in contact with the belts) and move the belts forwardly. The central occupant's belt 30 is extended from retractor 36 against the bias of its conventional rewind spring. When door 12 is opened to its complete extent (or partially opened depending upon the respective geometries) belts 22 and 30 and guide bars 82, 84 are in their forwardmost solid line position as indicated in FIG. 1. This lifts both belts off of the vehicle seat and permits easy entrance or exit to the center and outboard passengers' seats.

When door 12 is closed, the rewind springs of retractors 28 and 36 rewind webbing 22 and 30. As shaft 70 is rotated in the opposite direction, shaft 42 is rotated in its opposite direction resulting in carriage 74 moving linearally rearwards on the shaft until the full rearward, belt restraining positions are reached.

Spirally grooved shaft 42 is provided with a variably pitched groove as indicated above. The spacings of the groove are preferrably closer along the rearward portion of shaft 42 and increase along the forward portion of the shaft. This serves the purpose to provide for some rotation of the shaft without forward motion of the belts to accommodate larger size occupants in the seats. Likewise, the forwardmost end of shaft 42 may be provided with a smaller pitch to permit forward extension of the belts without rotation of the shaft should the occupant move against the belts when the belts are in their non-restraining position.

It should be noted that the present invention provides a passive seat belt system in which the anchor points of the belts for the center and outboard passengers' positions are fixed and thereby it is insured that a load-transmitting relationship is maintained when the belts are in use. It is to be understood that the combination of the spirally grooved shaft and transmission as set forth above may be employed with a single seat passenger's position and may be incorporated either between the vehicle seats, on the vehicle door or other suitable location. Although in a preferred embodiment to this invention the system is non-motorized, it can readily be seen that the system can be adapted for a motorized version which could be actuated upon opening of the vehicle door which in turn would transmit rotation to the sprocket transmission. It can also be seen that the retractor for the outboard passenger's position is utilized in accordance with this invention as the driving mechanism for moving both the outboard passenger's belt as well as the center passenger's belt to their non-restraining positions.

For improved side impact protection to the occupants, seat 14 may be provided with an extrusion 88 to limit side movement of the occupants, as set forth more fully in the parent application.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

We claim:

1. In a passive seat belt system including at least one seat belt mounted in said vehicle for movement between restraining and non-restraining positions for an occupant seat in said vehicle and movable means movable along a shaft mounted in said vehicle and operable to move said seat belt between its restraining and non-restraining positions, the improvement comprising:
said movable means comprising means for contacting said belt to move said belt between its said positions, said shaft being rotatably mounted in said vehicle and said shaft being rotatable in response to a force applied to said belt, said shaft comprising a grooved shaft and said movable means being movable along the grooves of said shaft.

2. The passive seat belt system of claim 1 wherein said system is non-motorized.

3. The passive seat belt system of claim 1 wherein said belt extends from a position fixed in said vehicle and is adapted to contact said movable means and then extend across said seat.

4. The passive seat belt system of claim 3 including emergency release means for releasing said belt from its restraining position.

5. The passive seat belt system of claim 3 wherein said movable means comprises a carrier movable along said grooves and said means for contacting said belt comprises a bar extending from said carrier.

6. The passive seat belt system of claim 5 wherein said bar is adapted to contact and move seat belts associated with adjacent seats in said vehicle into and out of their restraining positions.

7. The passive seat belt system of claim 3 wherein said belt extends from a seat belt retractor mounted at a fixed position in said vehicle and including transmission means operable to rotate said shaft upon rotation of said seat belt retractor in its winding and unwinding directions.

8. The passive seat belt system of claim 7 wherein one end of said belt is mounted on a door of said vehicle adjacent said seat, said winding and unwinding motion of said retractor being controlled by the closing and opening motion of said door.

9. The passive seat belt system of claim 8 wherein said retractor is mounted to the roof of said vehicle and said shaft is mounted along said roof in a substantially longitudinal direction in said vehicle.

10. The passive seat belt system of claim 9 wherein said movable means is aadapted to contact and move seat belts associated with adjoining seats in said vehicle.

11. A passive seat belt system for a vehicle having center and outboard passenger seating positions, a door adjacent said outboard passenger's seating position and a roof, said system comprising:
first anchor means mounted outboard of said outboard passenger's seating position;
second anchor means mounted at a fixed position in said vehicle;
a seat belt for said outboard passenger's seating position having one end attached to said first anchor means and the other end attached to said second anchor means;
third anchor means provided in said vehicle;
fourth anchor means mounted at a fixed position in said vehicle;
a seat belt for said center passenger's seating position having one end attached to said third anchor means, said third anchor means being located at a position such that said seat belt for said center passenger's seating position is adapted to extend across said seating position from the inboard side thereof, the other end of the belt being attached to said fourth anchor means; and
a grooved shaft rotatably mounted to said roof of said vehicle at a position adjacent to said center and outboard passengers' seating positions,
movable means movable along the grooves of said shaft, each of said belts being capable of contact with said movable means, said movable means being movable to a first position in said vehicle whereby said belts are in non-restraining positions to facilitate access to said center and outboard passenger's seating positions and said movable means being movable to a second position in said vehicle whereby said belts are in restraining positions to provide seat belt restraint for said seating positions.

12. The passive seat belt system of claim 11 wherein said system is non-motorized.

13. The passive seat belt system of claim 11 wherein said second anchor means comprises a seat belt retractor mounted along the roof of said vehicle and said shaft is mounted along said roof of said vehicle adjacent said retractor.

14. The passive seat belt system of claim 13 including transmission means operable to rotate said shaft upon rotation of said seat belt retractor in winding and unwinding directions.

15. The passive seat belt system of claim 14 wherein said retractor includes a rotatable shaft and said transmission is driven by rotation of said shaft.

16. The passive seat belt system of claim 15 wherein said transmission comprises a sprocket chain transmission.

17. The passive seat belt system of claim 15 wherein said movable means comprises a carrier movable along said grooves.

18. The passive seat belt system of claim 17 wherein said movable means comprises a bar attached to said carrier for contact with and movement of said belts, and said shaft extends substantially parallel to the longitudinal axis of said vehicle.

19. The passive seat belt system of claim 18 wherein said first anchor means is attached to said door, whereby door opening and closing motion results in rotation of said retractor shaft.

20. The passive seat belt system of claim 19 wherein one of said third and fourth anchor means comprises a seat belt retractor.

21. The passive seat belt system of claim 20 wherein said fourth anchor means comprises a seat belt retractor mounted to said roof of said vehicle adjacent said grooved shaft and said third anchor means is connected to the floor of said vehicle adjacent the inboard side of said center passenger's seating position.

22. The passive seat belt system of claim 21 including means for releasing said belts from their restraining positions.

* * * * *